US008659466B2

(12) United States Patent
Lee et al.

(10) Patent No.: US 8,659,466 B2
(45) Date of Patent: Feb. 25, 2014

(54) REMOTE CONTROL APPARATUS AND SYSTEM THEREOF

(75) Inventors: Jisun Lee, Seoul (KR); Jihea Kim, Seoul (KR); Yousook Eun, Seoul (KR)

(73) Assignee: LG Electronics, Inc., Seoul (KR)

( * ) Notice: Subject to any disclaimer, the term of this patent is extended or adjusted under 35 U.S.C. 154(b) by 148 days.

(21) Appl. No.: 13/180,939

(22) Filed: Jul. 12, 2011

(65) Prior Publication Data
US 2012/0013450 A1 Jan. 19, 2012

(30) Foreign Application Priority Data

Jul. 13, 2010 (KR) .................. 10-2010-0067498

(51) Int. Cl.
*H04L 17/02* (2006.01)
(52) U.S. Cl.
USPC .......................................... 341/176; 348/734
(58) Field of Classification Search
USPC ........................................... 341/176; 348/734
See application file for complete search history.

(56) References Cited

U.S. PATENT DOCUMENTS

| 4,855,746 A | * | 8/1989 | Stacy ............................ 341/176 |
| 5,564,078 A | * | 10/1996 | Nagai ........................ 455/575.3 |
| 6,750,803 B2 | * | 6/2004 | Yates et al. ..................... 341/176 |
| 6,798,341 B1 | | 9/2004 | Eckel et al. |
| 7,248,201 B2 | * | 7/2007 | Buccinna et al. .............. 341/176 |
| 2002/0118131 A1 | | 8/2002 | Yates et al. |
| 2006/0250377 A1 | | 11/2006 | Zadesky et al. |
| 2009/0212905 A1 | | 8/2009 | Batz et al. |
| 2010/0165215 A1 | * | 7/2010 | Shim ............................ 348/734 |

FOREIGN PATENT DOCUMENTS

WO  WO 2008146197 A1 * 12/2008

* cited by examiner

*Primary Examiner* — Daniel Wu
*Assistant Examiner* — Benyam Haile
(74) *Attorney, Agent, or Firm* — McKenna Long & Aldridge, LLP

(57) ABSTRACT

A remote control apparatus and a system thereof are disclosed. A remote control apparatus includes a main body; a sliding unit that is slidable along a plurality of positions at the main body; a communication unit to communicate with an external device; a controller to control a mode of the external device in correspondence to a position among the plurality of positions of the sliding unit with respect to the main body; a display unit to display status information of the external device; and a manipulation unit to allow a user input to change the status information.

10 Claims, 9 Drawing Sheets

REMOTE CONTROL APPARATUS AND SYSTEM THEREOF

CROSS-REFERENCE TO RELATED APPLICATION

This application claims the priority benefit of Korean Patent Application No. 10-2010-0067498, filed on Jul. 13, 2010 in the Korean Intellectual Property Office, the disclosure of which is incorporated herein by reference.

BACKGROUND OF THE INVENTION

1. Field of the Invention

The present invention relates to a remote control apparatus and a system thereof, and more particularly, to a remote control apparatus in which a manipulation unit can be displayed in various manners in correspondence to modes of a control target appliance, and a system thereof.

2. Description of the Related Art

A remote control apparatus is a portable apparatus that can control operation of an external device using infrared communication and the like. In addition to being used in televisions, DVD players, home theater systems, and air conditioners, application of such a remote control apparatus has been expanded to personal computers and the like. When using the remote control apparatus, a user can simply control operations of an electronic device without having to be physically preset at the appliance.

Due to diversity in operation modes of external devices and developments in the techniques of controlling a plurality of external devices using a single remote control apparatus, the number of operating keys provided in the remote control apparatus is increasing.

However, such an increase in the number of operating keys may deteriorate the outer appearance of the remote control apparatus, and moreover, may cause difficulty in discrimination of operating keys used to control the external apparatus.

SUMMARY OF THE INVENTION

Therefore, the present invention has been made in view of the above problems, and it is an object of the present invention to provide a remote control apparatus which can change modes of an external device via a sliding operation of a sliding unit thereof and also, can provide status information of the external device and operating keys in correspondence to modes of the external device, and a system thereof.

In accordance with an aspect of the present invention, there is provided a remote control apparatus including a main body; a sliding unit that is slidable along a plurality of positions at the main body; a communication unit to communicate with an external device; a controller to control a mode of the external device in correspondence to a position among the plurality of positions of the sliding unit with respect to the main body; a display unit to display status information of the external device; and a manipulation unit to allow a user input to change the status information.

In accordance with another aspect of the present invention, there is provided a communication system including an electronic device and a remote control device to communicate with the electronic device, including the electronic device including a first communication unit; and the remote control device including a main body, a sliding unit that is slidable along the main body such that the sliding unit overlaps with a portion of the main body at a first position and with at least part of the remaining portion of the main body at a second position, a controller to generate a command to change a mode of the electronic device in correspondence to the sliding unit sliding from a first position to a second position, and a second communication unit to communicate the command generated by the controller to the first communication unit of the electronic device.

In accordance with the other aspect of the present invention, there is provided an external device control method of a remote control apparatus including a main body and a sliding unit that is slidable along the main body, the external device control method including sensing by the controller, a sliding of the sliding unit from a first position where the sliding unit overlaps with a portion of the main body to a second position where the sliding unit overlaps with at least part of the remaining portion of the main body; generating a command by the controller to change a mode of an external device corresponding to a sliding operation of the sliding unit; and causing by the controller to display status information of the external device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
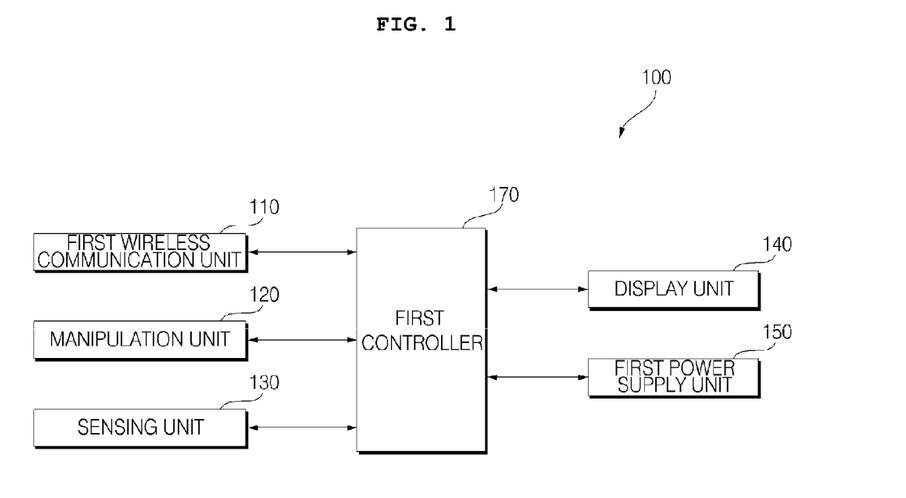
FIG. 1 is a block diagram illustrating a configuration of a remote control apparatus according to an embodiment of the present invention.

FIG. 1 is a block diagram illustrating a configuration of a remote control apparatus according to an embodiment of the present invention.

Referring to FIG. 1, the remote control apparatus 100 may include a first wireless communication unit 110, a manipulation unit 120, a sensing unit 130, a display unit 140, a first power supply unit 150, and a first controller 170.

The first wireless communication unit 110 receives or transmits signals from or to an external device. More particularly, the first wireless communication unit 110 transmits a control command to the external device and receives status information from the external device. In the present embodiment, the remote control apparatus 100 may perform signal reception and transmission with the external device according to Infrared (IR) communication standards. However, the remote control apparatus 100 may also perform signal reception and transmission with the external device using other local area communication standards, such as Radio Frequency (RF) communication and the like.

The manipulation unit 120 may include a key pad or buttons. A user can input a command, related to operation of the external device, to the remote control apparatus 100 by manipulating the manipulation unit 120. Assuming that the manipulation unit 120 includes physical buttons, the user may input a command, related to operation of the external device, to the remote control apparatus 100 by pushing the physical buttons. On the other hand, assuming that the manipulation unit 120 includes a touch screen, the user may input a command, related to operation of the external device, to the remote control apparatus 100 by touching keys displayed on the touch screen. In addition, the manipulation unit 120 may include a variety of other input means, such as scroll keys, jog keys, and the like.

The sensing unit 130 may include a sensor to sense movement of the remote control apparatus 100. More particularly, the remote control apparatus 100 includes a main body 200, and a sliding unit 300 which is slidable in at least one direction of the main body 200 and is disposed to overlap with a portion of the main body 200. The sensing unit 130 may sense a sliding operation of the sliding unit 300.

The display unit 140 displays images, text, icons, and the like corresponding to manipulation of the manipulation unit 120 or signals transmitted to the external device. In particular, the display unit 140 displays status information of the external device in correspondence to modes of the external device.

The first power supply unit 150 supplies power to the remote control apparatus 100. The first power supply unit 150 stops supply of power if a user command is not input for a predetermined time or if a specific sliding operation is sensed. This may reduce power consumption. The first power supply unit 150 may resume supply of power if operating keys of the remote control apparatus 100 are manipulated or if a specific sliding operation is sensed.

The first controller 170 controls all items related to the control of the remote control apparatus 100. The first controller 170 may transmit signals, corresponding to predetermined key manipulation using the manipulation unit 120, or signals corresponding to the sliding operation of the sliding unit 300, to the external device via a wireless communication unit.

Figure 2:
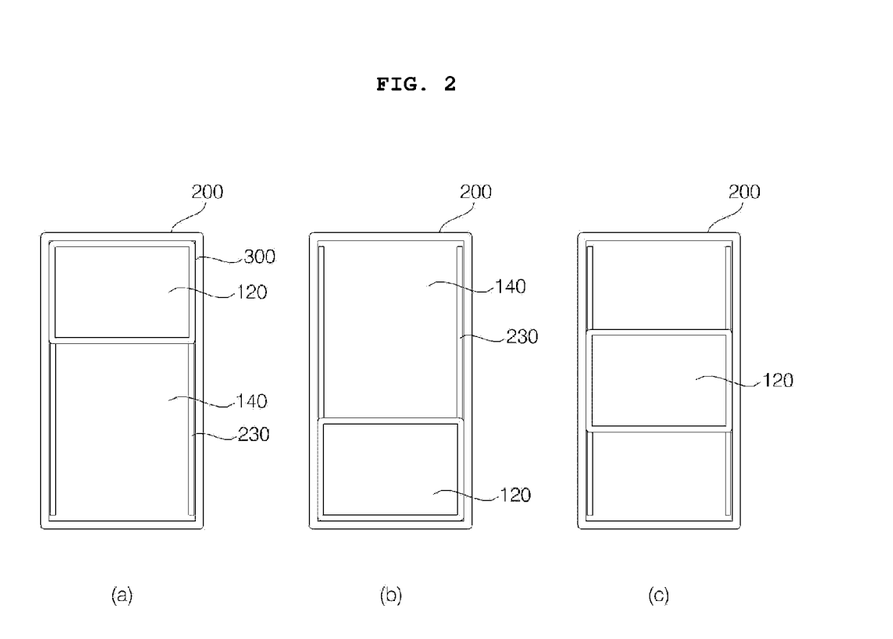
FIGS. 2(a) to 2(c) are front views illustrating an external appearance of the remote control apparatus according to the embodiment of the present invention.

FIGS. 2(a) to 2(c) are front views illustrating an external appearance of the remote control apparatus according to the embodiment of the present invention.

As illustrated in FIGS. 2(a) to 2(c), the remote control apparatus 100 includes the main body 200 and the sliding unit 300. The main body 200 has a bar shape. The display unit 140 is located at an upper surface of the main body 200, and the first wireless communication unit 110 is located at a lateral surface of the main body 200. The main body 200 receives a variety of elements required for operation of the remote control apparatus 100. The main body 200 may advantageously have rounded corners to provide an aesthetically pleasing external appearance.

The manipulation unit 120 is located at an outer surface of the sliding unit 300, and preferably, takes the form of a touch screen. Sliding grooves 230 are longitudinally indented in opposite lateral edges of the surface of the main body 200 facing the display unit 140. The sliding unit 300 is movable over the display unit 140 along the sliding grooves 230.

The sliding unit 300 is slidable so as to be located at a first position as illustrated in FIG. 2(a). The first position corresponds to a position where the sliding unit 300 covers an upper region of the display unit 140 to prevent the upper region of the display unit 140 from being seen from the outside. The first controller 170 stops supply of power to the display unit 140 and the manipulation unit 120 in a state in which the sliding unit 300 is located at the first position. Thus, the display unit 140 and the manipulation unit 120 remain off and do not act to display any information.

The sliding unit 300 is also slidable so as to be located at a second position and a third position as illustrated in FIGS. 2(b) and 2(c) respectively. The second position corresponds to a position where the sliding unit 300 covers a lower region of the display unit 140 to prevent the lower region of the display unit 140 from being seen from the outside. The third position corresponds to a position where the sliding unit 300 covers a portion of the upper region and a portion of the lower region of the display unit 140 to prevent a middle region of the display unit 140 from being seen from the outside. The first controller 170 supplies power to the display unit 140 and the manipulation unit 120 in a state in which the sliding unit 300 is located at the second position. Thus, the display unit 140 and the manipulation unit 120 act to display specific information. The display unit 140 preferably displays status information of the external device, and the manipulation unit 120 preferably displays operating keys required to change the status information. In addition, to limit power consumption, power need not be supplied to a partial region of the display unit 140 covered by the sliding unit 300. Preferably, the display unit 140 and the manipulation unit 120 take the form of touch screens.

Figure 3:
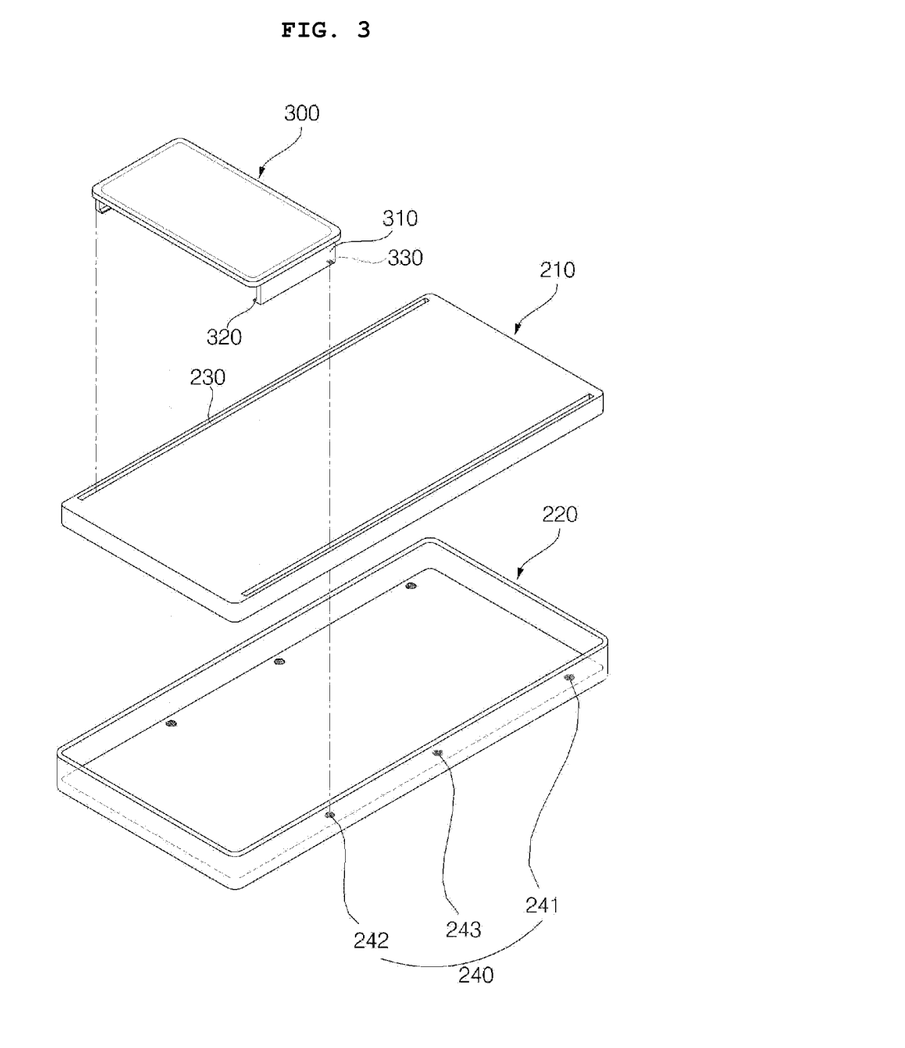
FIG. 3 is an exploded perspective view of the remote control apparatus according to the embodiment of the present invention.

FIG. 3 is an exploded perspective view of the remote control apparatus according to the embodiment of the present invention.

As illustrated in FIG. 3, the sliding unit 300 includes ribs 310 provided at opposite lateral edges thereof so as to extend orthogonally to the manipulation unit 120. Although the present embodiment illustrates the ribs 310 as being provided at opposite lateral edges of the sliding unit 300, in an alternative embodiment, a single rib may be formed at one lateral edge of the sliding unit 300. The ribs 310 are movable in the sliding grooves 230 indented in the main body 200. Each rib 310 may be provided at a distal end thereof with an anti-separating portion 320 protruding inward of the main body 200. The anti-separating portion 320 may extend orthogonally to the rib 310. The anti-separating portion 320 serves to prevent the sliding unit 300 from being separated from the main body 200 while moving along the sliding grooves 230.

The ribs 310 of the sliding unit 300 may be provided with rib magnets 330 respectively. Although the present embodiment illustrates the rib magnets 330 as being located at the anti-separating portions 320 of the ribs 310, the present invention is not limited thereto.

In the meantime, the main body 200 may be divided into an upper case 210 and a lower case 220. In an alternative embodiment, the main body 200 may include a single case. The display unit 140 is located at an outer surface of the upper case 210, and the sliding grooves 230 are formed in parallel to each other along lateral edges of the display unit 140. A circuit of a portable terminal, such as a Printed Circuit Board (PCB), may be mounted in the lower case 220. In addition, stationary magnets 240 are provided at surfaces of the lower case 220 coming into contact with the ribs 310 of the sliding unit 300. The stationary magnets 240 include first stationary magnets 241 to come into contact with the rib magnets 330 of the sliding unit 300 when the sliding unit 300 is located at the first position, second stationary magnets 242 to come into contact with the rib magnets 330 of the sliding unit 300 when the sliding unit 300 is located at the second position, and third stationary magnets 243 to come into contact with the rib magnets 330 of the sliding unit 300 when the sliding unit 300 is located at the third position. Although the present embodiment describes the stationary magnets 240 as being located in the lower case 220, in an alternative embodiment, positions of the stationary magnets 240 may be changed according to positions of the rib magnets 330 of the sliding unit 300.

With the above described configuration, the rib magnets 330 of the sliding unit 300 may magnetically attract the first stationary magnets 241 when the sliding unit 300 is moved along the sliding grooves 230 to the first position. Similarly, the rib magnets 330 of the sliding unit 300 magnetically attract the second stationary magnets 242 when the sliding unit 300 is moved to the second position, and also, magnetically attract the third stationary magnets 243 when the sliding unit 300 is moved to the third position.

The rib magnets 330 and the stationary magnets 240 have opposite polarities, thus being subjected to magnetic attractive force. In this way, when the user slides the sliding unit 300, the user may identify the moved position of the sliding unit 300 and may fix the sliding unit 300 at a desired position.

Although the present embodiment illustrates the display unit 140 as being located at one surface of the main body 200 and the manipulation unit 120 as being located at one surface of the sliding unit 300, the present invention is not limited thereto. In an alternative embodiment, the display unit 140 may be located in an upper region of the main body 200 and the manipulation unit 120 may be located in a lower region of the main body 200. In the alternative embodiment, the sliding unit 300 is preferably made of a soft material.

The above-described remote control apparatus 100 can perform wireless communication with a variety of electronic devices. Examples of these electronic devices include televisions, DVD players, home theater systems, air conditions, and a variety of other appliances. In the present embodiment, an air conditioner will be described by way of example. However, it will be understood that the present invention is not limited to the air conditioner.

Figure 4:
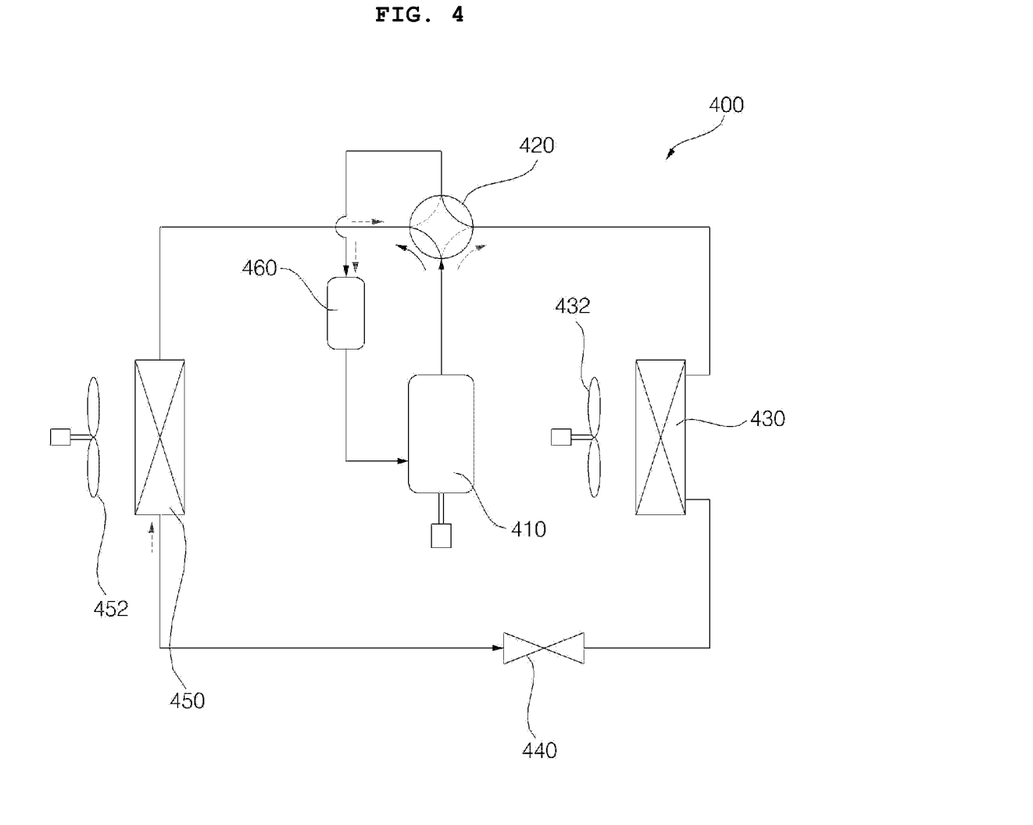
FIG. 4 is a diagrammatic view of an air conditioner according to an embodiment of the present invention.
Figure 5:
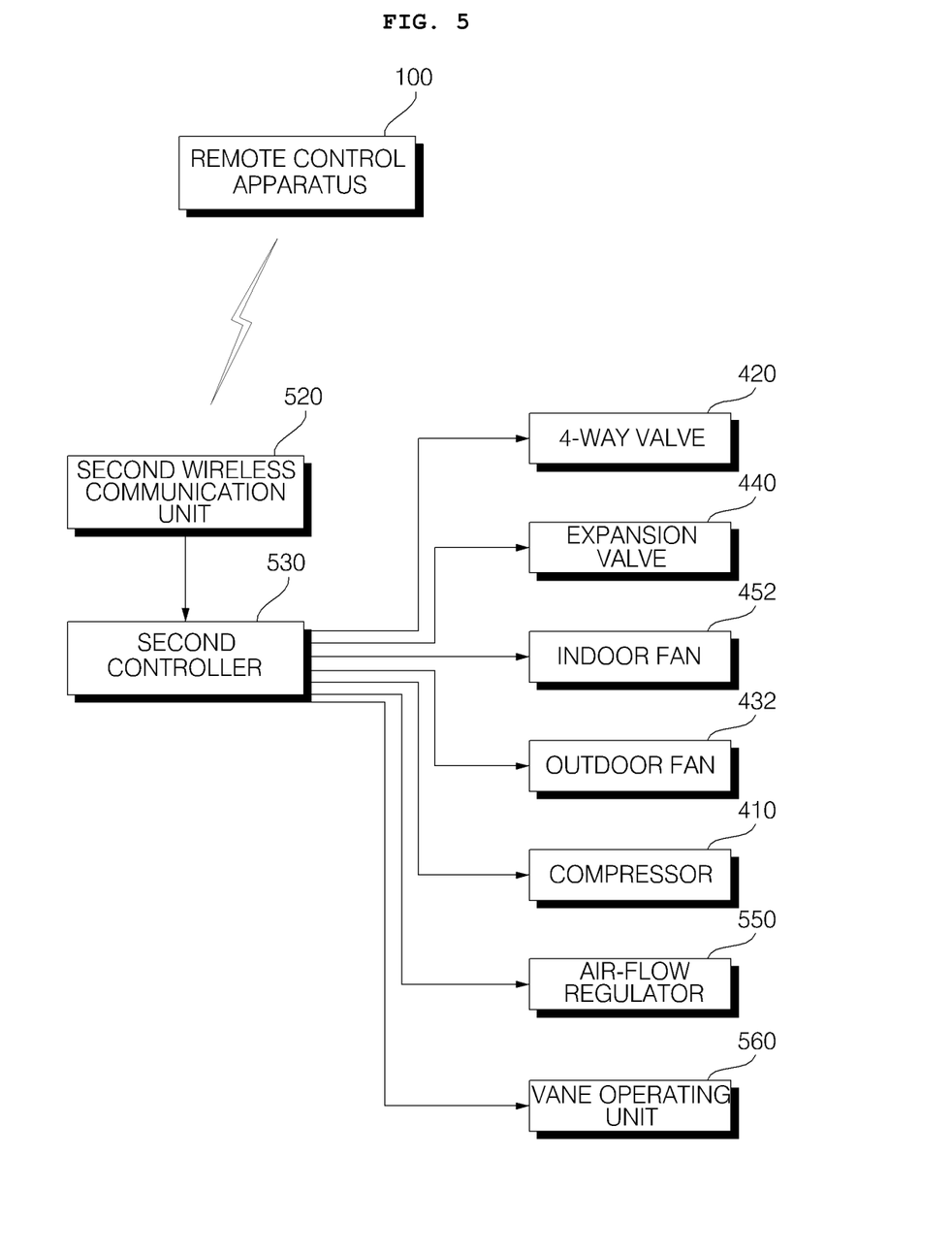
FIG. 5 is a block diagram of the air conditioner illustrated in FIG. 4.

FIG. 4 is a diagrammatic view of an air conditioner according to an embodiment of the present invention, and FIG. 5 is a block diagram of the air conditioner illustrated in FIG. 4.

Referring to FIGS. 4 and 5, the air conditioner 400 includes, e.g., a compressor 410, a 4-way valve 420, an outdoor heat exchanger 430, an expansion valve 440, an indoor heat exchanger 450, an accumulator 460, a second wireless communication unit 520, a second controller 530, an air-flow regulator 550, and a vane operating unit 560.

The air conditioner 400 may be broadly divided into an outdoor unit and an indoor unit. The outdoor unit may include the compressor 410, the 4-way valve 420, and the outdoor heat exchanger 430, and the indoor unit may include the indoor heat exchanger 450, the second wireless communication unit 520, and the air-flow regulator 550. The expansion valve 440 may be included in both the indoor unit and the outdoor unit, or may be included only in the outdoor unit.

The air conditioner 400 may serve as a cooler to cool a room, or may serve as a heat pump to cool or heat a room.

In the case where the air conditioner 400 is a heat pump, the outdoor heat exchanger 430 serves as a condenser in a cooling operation mode and as an evaporator in a heating operation mode. The indoor heat exchanger 450 serves as an evaporator in a cooling operation mode and as a condenser in a heating operation mode.

The compressor 410 compresses low-temperature and low-pressure gas-phase refrigerant introduced thereinto so as to discharge high-temperature and high-pressure gas-phase refrigerant. The compressor 410 may be a variable capacity compressor or a fixed capacity compressor. Although there are various configurations of variable capacity compressors, the compressor 410 may be an inverter type compressor for the sake of easy control.

The 4-way valve 420 is connected to the compressor 410 and serves as a flow path switching valve to control the flow of refrigerant between a cooling operation mode and a heating operation mode. For example, the 4-way valve 420 guides the compressed refrigerant from the compressor 410 to the outdoor heat exchanger 430 in a cooling operation mode and to the indoor heat exchanger 450 in a heating operation mode.

The outdoor heat exchanger 430 serves as a condenser in a cooling operation mode and as an evaporator in a heating operation mode. The outdoor heat exchanger 430 performs heat exchange between refrigerant and air via operation of an outdoor fan 432.

The expansion valve 440 is provided between the indoor heat exchanger 450 and the outdoor heat exchanger 430 and serves to decompress condensed refrigerant. For example, in a cooling operation mode, the expansion valve 440 decompresses liquid-phase refrigerant transmitted from the outdoor heat exchanger 430 and supplies the decompressed refrigerant into the indoor heat exchanger 450. On the other hand, in a heating operation mode, the expansion valve 440 decompresses liquid-phase refrigerant transmitted from the indoor heat exchanger 450 and supplies the decompressed refrigerant into the outdoor heat exchanger 430.

The indoor heat exchanger 450 serves as an evaporator in a cooling operation mode and as a condenser in a heating operation mode. The indoor heat exchanger 450 performs heat exchange between refrigerant and air via operation of an indoor fan 452.

The accumulator 460 is provided between a suction side of the compressor 410 and the 4-way valve 420 and serves to remove moisture and impurities from gas-phase refrigerant temporarily stored therein so as to supply constant-pressure refrigerant to the compressor 410. For example, in a cooling operation mode, the accumulator 460 acts to remove moisture and impurities from gas-phase refrigerant having passed through the indoor heat exchanger 450 and the 4-way valve 420 prior to supplying the refrigerant to the compressor 410. On the other hand, in a heating operation mode, the accumulator 260 acts to remove moisture and impurities from gas-phase refrigerant having passed through the outdoor heat exchanger 430 and the 4-way valve 420 prior to supplying the refrigerant to the compressor 410.

Although not illustrated in the drawings, a phase separator may be further provided near the indoor heat exchanger 450. In this case, a second expansion valve may be further provided to decompress refrigerant having passed through the phase separator. The aforementioned elements 410, 420, 430, 440, 450 and 460 may be connected to one another using pipes.

The second wireless communication unit 520 receives a mode change command from the remote control apparatus 100 and applies the received command to the second controller 530, or transmits status information of the air conditioner 400 received from the second controller 530 to the remote control apparatus 100.

The second controller 530 receives the mode change command from the second wireless communication unit 520 and controls general operations of the air conditioner 400.

For example, if a power on mode command of the air conditioner 400 is input to the second controller 530, the second controller 530 controls the vane operating unit 560 to suction or discharge air into or from the indoor heat exchanger 550.

Also, if a signal for setting a desired temperature is input to the second controller 530, the second controller 530 first sets a target frequency and then, drives the compressor 410 at the target frequency. In addition, the second controller 530 controls opening/closing operations of the 4-way valve 420 and the expansion valve 440, thereby controlling operations of the indoor fan 452 and the outdoor fan 432.

If a signal for setting the flow direction of indoor air is input to the second controller 530, the second controller 530 controls operation of the air-flow regulator 550 that regulates the discharge direction of heat-exchanged air having passed through the indoor heat exchanger 450.

Although the drawings illustrate the second controller 530 as being connected to the compressor 410, the indoor fan 452, and the outdoor fan 432 so as to implement direct control thereof, the present invention is not limited thereto, and the second controller 530 may control a motor (not shown) and an inverter (not shown) for the compressor 410, and motors (not shown) for the indoor fan 452 and the outdoor fan 432.

In the meantime, the display unit 140 may serve to display status information in correspondence to operation of the air conditioner 400 as well as preset status information.

Figure 6:
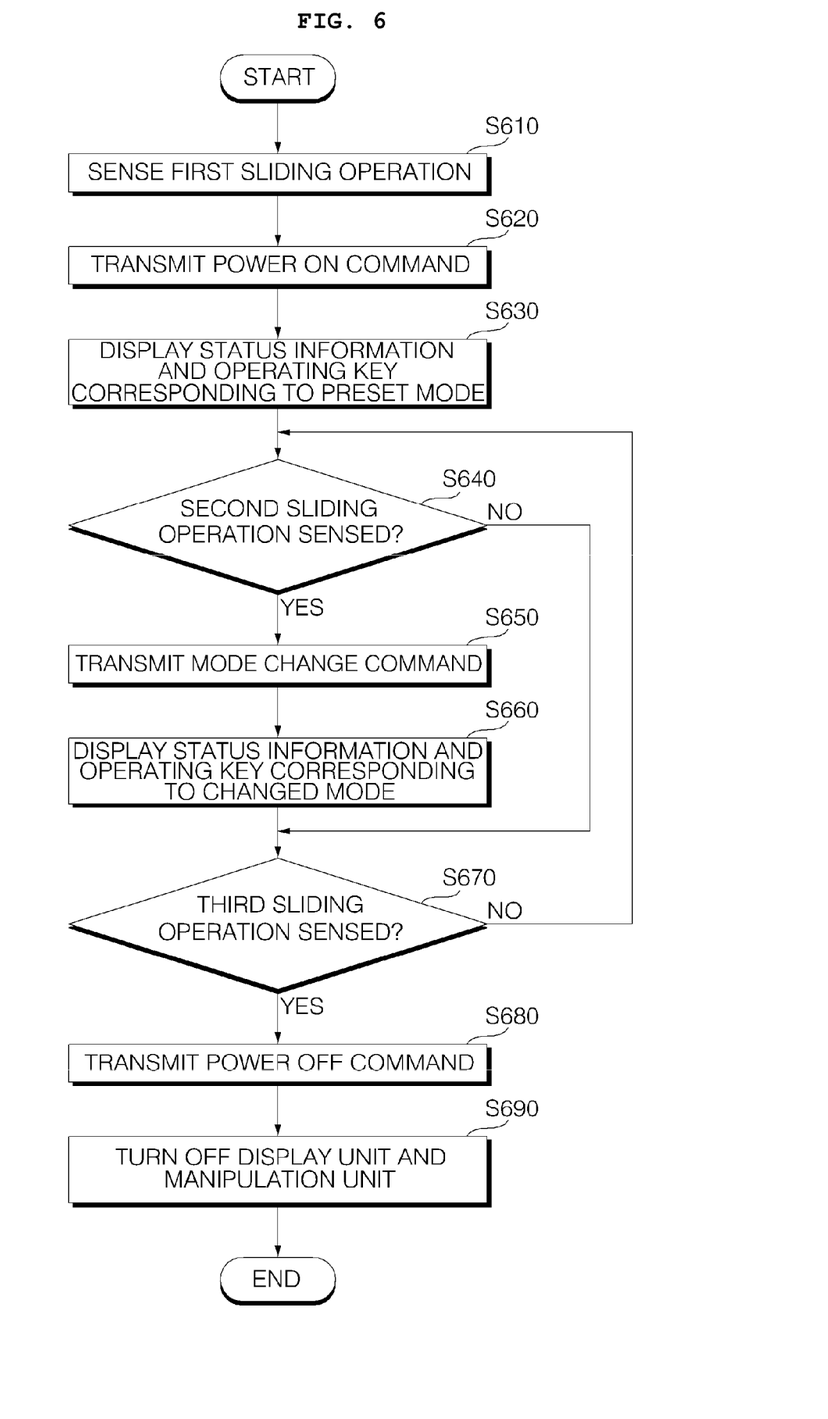
FIG. 6 is a flow chart illustrating an operating method of the remote control apparatus according to an embodiment of the present invention.

FIG. 6 is a flow chart illustrating an operating method of the remote control apparatus according to an embodiment of the present invention.

Referring to FIG. 6, the first controller 170 senses a first sliding operation (S610). The first sliding operation corresponds to an operation by which the sliding unit 300, disposed at an upper region of the main body 200, slides to a lower region of the main body 200.

If the first sliding operation is sensed, the first controller 170 of the remote control apparatus 100 generates a power on command and transmits this command to an external device (for example, an air conditioner as will be described hereinafter) (S620). The air conditioner is turned on in response to the power on command, and operates in a preset operation mode.

The first controller 170 also turns on the display unit 140 and the manipulation unit 120. Then, if status information of the air conditioner corresponding to the preset operation mode is transmitted from the air conditioner to the first controller 170, the first controller 170 displays the status information on the display unit 140 and also, displays operating keys corresponding to the preset operation mode on the manipulation unit 120 (S630). The air conditioner may be designed to perform a previous operation mode before a previous power off command is applied or to perform a specific operation mode if the air conditioner is turned on.

In this case, the air conditioner operates in the preset operation mode, and transmits current status information (e.g., current temperature, and humidity) of the air conditioner and desired status information (hereinafter, referred to as "target status information") corresponding to the preset operation mode to the remote control apparatus 100. Thereby, the first controller 170 displays the status information of the air conditioner corresponding to the preset operation mode on the display unit 140, and also, displays operating keys corresponding to the preset operation mode on the manipulation unit 120. The operating keys are preferably keys used to set the target status information.

Then, the first controller 170 determines whether or not a second sliding operation is sensed (S640). The user may slide the sliding unit 300 such that a portion of the sliding unit 300 located in the lower region of the main body 200 is moved to the upper region of the main body 200 and is then returned to the original lower region. If this sliding operation occurs, the first controller 170 determines that the second sliding operation is sensed.

If the second sliding operation is sensed (S640-Y), the first controller 170 generates a mode change command and transmits this command to the air conditioner (S650). Modes of the air conditioner may include a power off mode in which the air conditioner remains off and a power on mode in which the air conditioner is turned on to perform a specific operation. In turn, the power on mode may be divided into one or more operation modes according to different operating statuses. For example, the operation modes of the air conditioner may include a cooling operation mode to lower a current indoor temperature to a preset target temperature, an artificial intelligence operation mode to automatically control air temperature and wind strength according to an indoor condition including an indoor temperature, a dehumidifying operation mode to lower a current indoor humidity to a preset target humidity, and a heating operation mode to raise an indoor temperature to a preset target temperature. Information related to the aforementioned operation modes is stored in sequence in a storage unit (not shown) of the air conditioner. The second controller 530 may change a current operation mode to a next operation mode of the air conditioner based on the information related to the operation modes stored in the storage unit.

For example, it is assumed that information is stored in the sequence of the cooling operation mode, the artificial intelligence operation mode, the dehumidifying operation mode and the heating operation mode. If the second sliding operation is sensed in a state in which the air conditioner is set to the cooling operation mode, the first controller 170 transmits a mode change command to the air conditioner, and the second controller 530 of the air conditioner changes the cooling operation mode to the next artificial intelligence operation mode, and controls functional blocks of the air conditioner in correspondence to the artificial intelligence operation mode.

The first controller 170 receives status information of the air conditioner corresponding to the changed mode from the air conditioner and thereafter displays the status information on the display unit 140 and operating keys corresponding to the changed mode on the manipulation unit 120 (S660). The status information corresponding to the changed mode may be divided into current status information corresponding to the changed mode and target status information.

For example, if the changed mode is the cooling operation mode, the first controller 170 receives information related to a current indoor temperature, the discharge direction and strength of wind, and a target temperature from the air conditioner and displays the information on the display unit 140. Also, the first controller 170 displays operating keys required to change the status information of the air conditioner corresponding to the cooling operation mode on the manipulation unit 120. In general, the operating keys corresponding to the cooling operation mode may include keys to control air temperature and the direction and strength of wind.

Then, the first controller 170 determines whether or not a third sliding operation is sensed (S670). The third sliding operation is the inverse of the first sliding operation, by which the sliding unit 300 located in the lower region of the main body 200 is moved to the upper region of the main body 200.

If the third sliding operation is sensed (S670-Y), the first controller 170 generates a power off command and transmits this command to the air conditioner (S680). Thereby, the second controller 530 of the air conditioner halts all active operation and turns off the air conditioner.

Also, the first controller 170 may turn off the display unit 140 and the manipulation unit 120, and also, may turn off the remote control apparatus 100.

As a result of controlling operation of the air conditioner via the sliding operation of the sliding unit 300, the user may more dynamically control the air conditioner.

Figure 7:
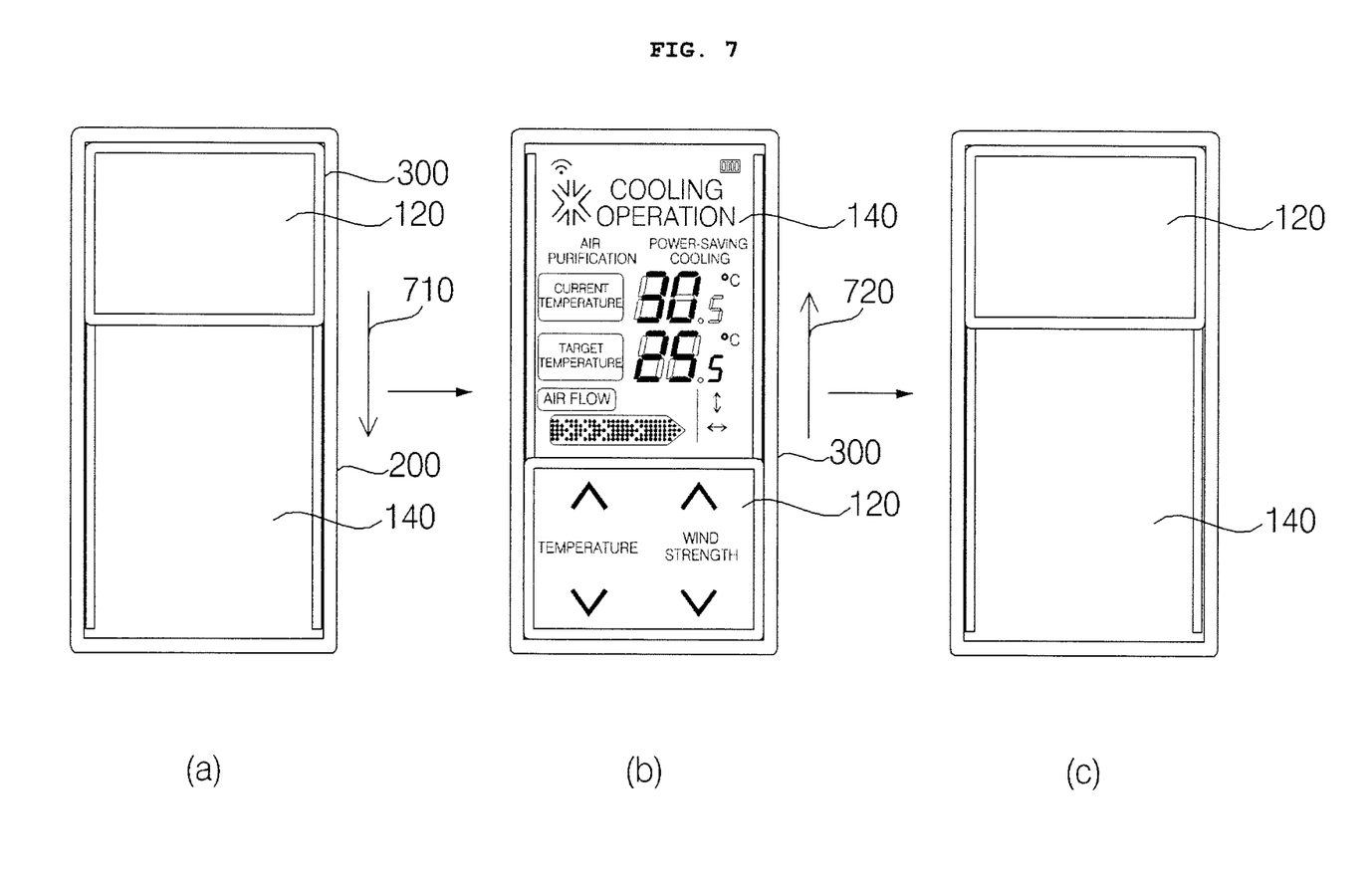
FIGS. 7(a) to 7(c) are reference views illustrating operation of a remote control apparatus according to a first embodiment of the present invention.

FIGS. 7(a) to 7(c) are views illustrating operation of the remote control apparatus according to a first embodiment of the present invention.

As illustrated in FIG. 7(a), the sliding unit 300 may be originally located in an upper region of the display unit 140, i.e. of the main body 200, and the user may slide the sliding unit 300 to the lower region of the main body 200 via the first sliding operation designated by the arrow 710. Thus, the first controller 170 generates a power on command upon sensing the first sliding operation, and transmits this command to the air conditioner. Thereby, the air conditioner is turned on and performs an operation corresponding to a preset operation mode. In this case, the air conditioner transmits status information of the air conditioner and information related to operating keys corresponding to the preset operation mode to the remote control apparatus 100. The first controller 170 of the remote control apparatus 100 displays the status information of the air conditioner on the display unit 140 and the operating keys on the manipulation unit 120.

Then, the user may slide the sliding unit 300 located in the lower region of the main body 200 to the upper region of the main body 200 via the third sliding operation designated by the arrow 720 as illustrated in FIG. 7(b). Thus, the first controller 170 generates a power off command upon sensing the third sliding operation and transmits this command to the air conditioner. The second controller 530 turns off the air conditioner. Also, the first controller 170 stops supply of power to the display unit 140 and the manipulation unit 120 as illustrated in FIG. 7(c).

Figure 8:
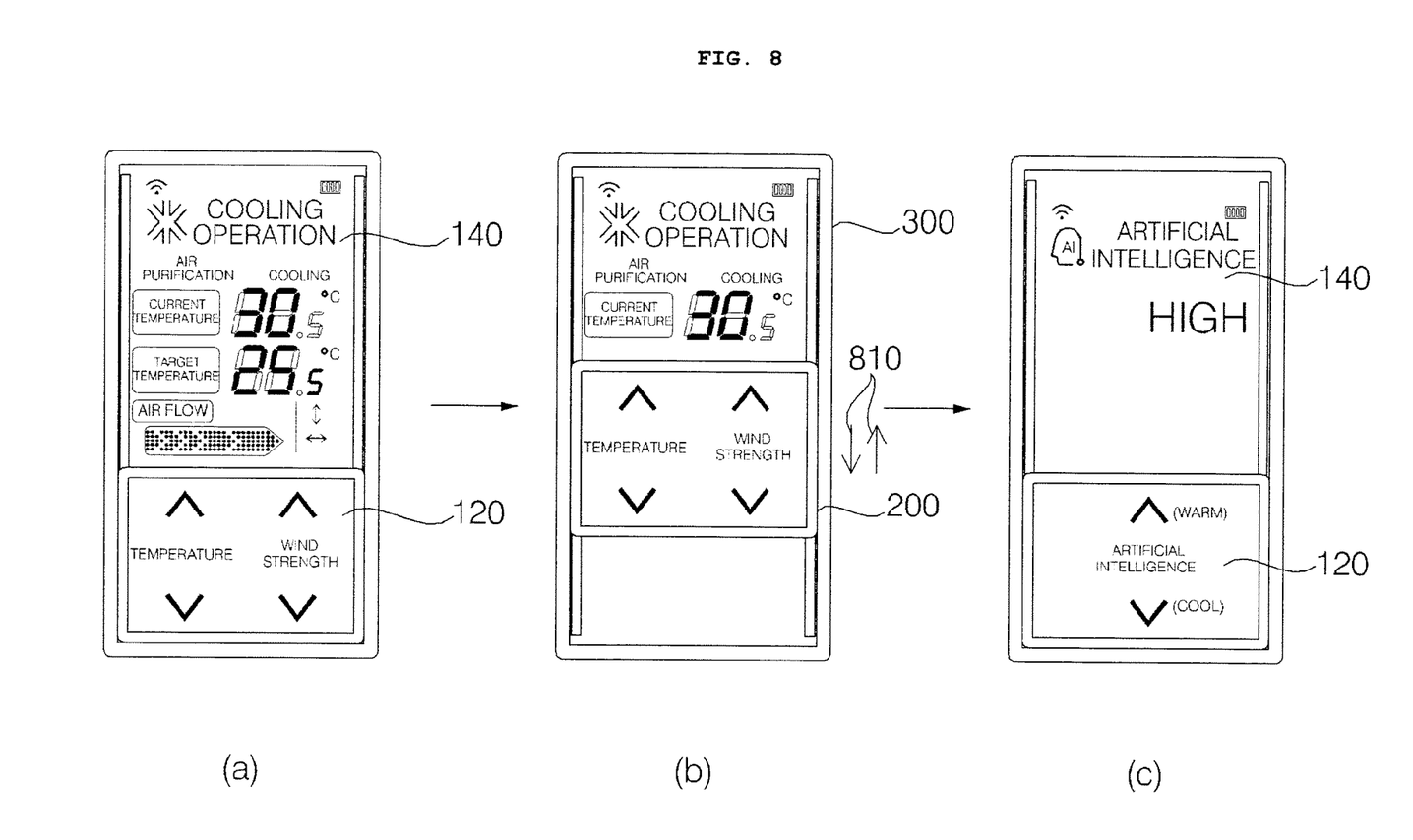
FIGS. 8(a) to 8(c) are reference views illustrating operation of the remote control apparatus according to a second embodiment of the present invention.

FIGS. 8(a) to 8(c) are views illustrating operation of the remote control apparatus according to a second embodiment of the present invention.

FIG. 8(a) illustrates a state in which the sliding unit 300 is located in the lower region of the main body 200. Then, as illustrated in FIG. 8(b), the user may slide the sliding unit 300 upward such that the sliding unit 300 overlaps with a portion of the upper region of the main body 200 and successively, may slide the sliding unit 300 downward such that a portion of the sliding unit 300 is moved from the upper region to the lower region of the main body 200. This sliding operation is designated by the arrows 810. The first controller 170 senses the second sliding operation, and generates a mode change command for changing a current operation mode of the air conditioner to a next operation mode and transmits this command to the air conditioner. Thereby, the air conditioner changes a current operation mode to the stored next operation mode and transmits status information of the air conditioner and information related to operating keys corresponding to the next operation mode to the remote control apparatus 100. The first controller 170, as illustrated in FIG. 8(c), displays the status information corresponding to the next operation mode on the display unit 140 and operating keys corresponding to the next operation mode on the manipulation unit 120. For example, the user may input a command to change the status information of the air conditioner by touching a region where the operating keys are displayed.

As described above, operating keys available for the respective operation modes are limited and therefore, only operating keys available for the preset mode are displayed on the manipulation unit 120 of the remote control apparatus 100. In this way, the user can manipulate the air conditioner without difficulty.

Figure 9:
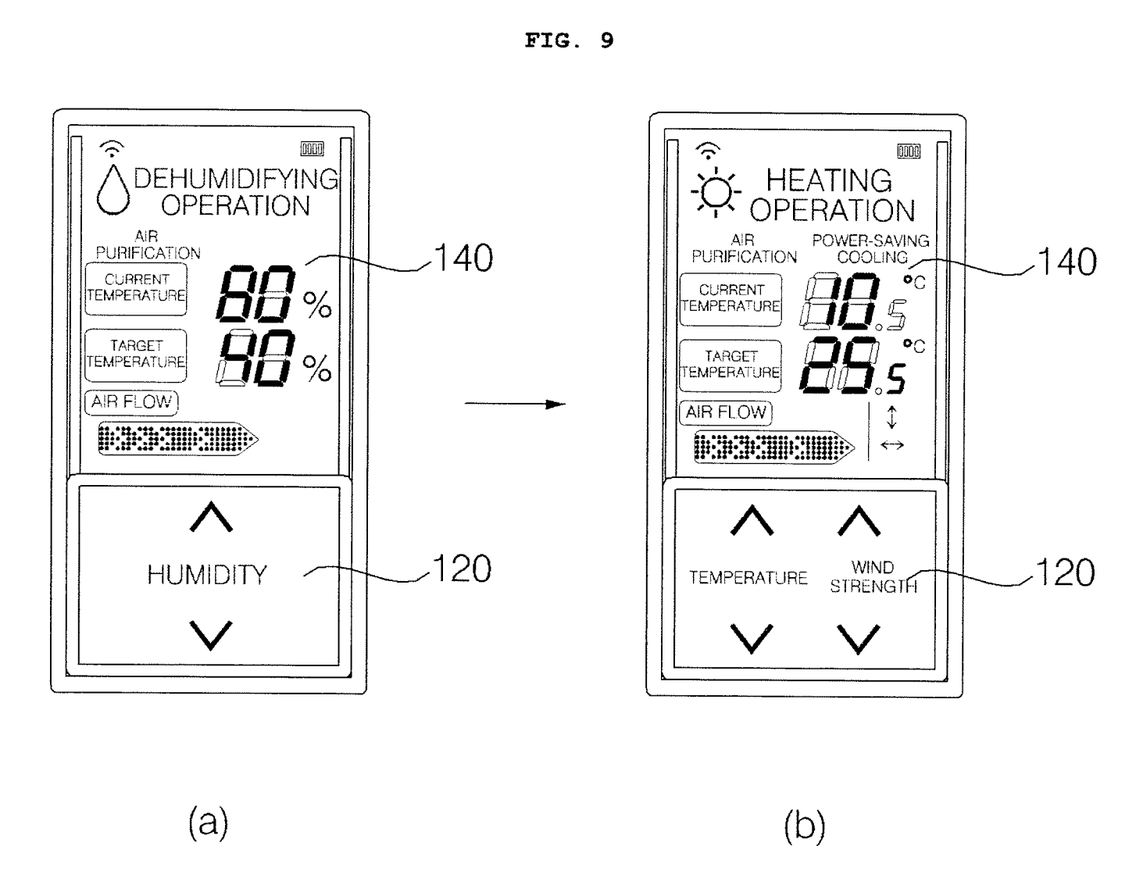
FIGS. 9(a) and 9(b) are reference views illustrating status information and operating keys corresponding to an operation mode according to an embodiment of the present invention.

FIGS. 9(a) and 9(b) are views illustrating status information and operating keys in correspondence to an operation mode according to an embodiment of the present invention.

In the dehumidifying operation mode, as illustrated in FIG. 9(a), the display unit 140 may display information related to a current humidity and a target humidity, and the manipulation unit 120 may display operating keys required to change the target humidity. The user may change the target humidity by touching a region where the corresponding operating keys are displayed.

In the heating operation mode, as illustrated in FIG. 9(b), the display unit 140 may display information related to a current temperature and a target temperature, and the manipulation unit 120 may display operating keys required to change the target temperature and the strength of wind. The user may change the target temperature and the strength of wind by touching a region where the corresponding operating keys are displayed.

Although the present embodiment illustrates the manipulation unit 120 as being disposed at one surface of the sliding unit 300 and the display unit 140 as being disposed at one surface of the main body 200, the present invention is not limited thereto. The display unit 140 and the manipulation unit 120 may be disposed at different positions on one surface of the main body 200. Also, the sliding unit 300 is preferably made of a transparent or semitransparent soft material, to allow the user to perceive and manipulate the operating keys of the manipulation unit 120.

Figure 10:
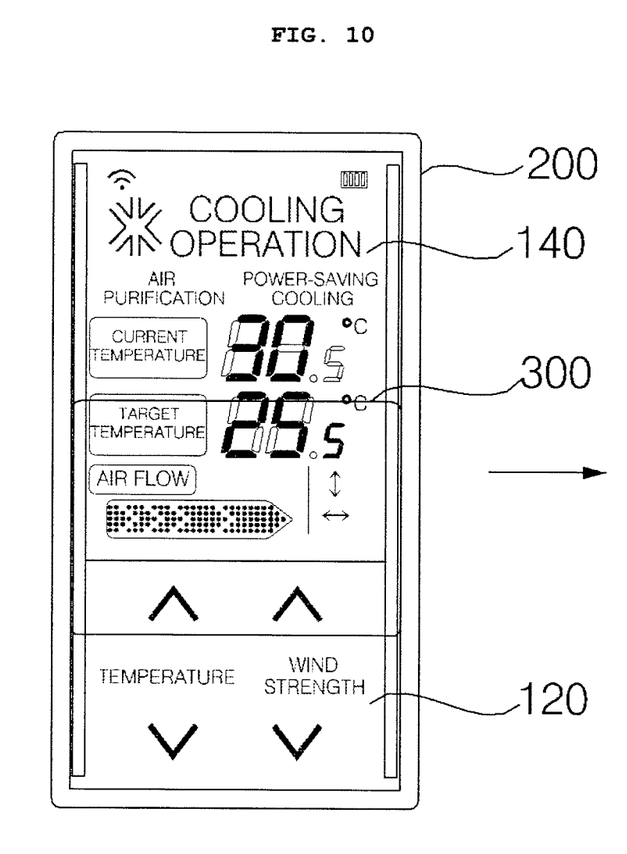
FIG. 10 is a reference view illustrating an arrangement relationship between a display unit and a manipulation unit according to an embodiment of the present invention.

FIG. 10 is a view illustrating an arrangement relationship between the display unit and the manipulation unit according to an embodiment of the present invention.

Since the display unit 140 and the manipulation unit 120 are disposed at one surface of the main body 200, as illustrated in FIG. 10, the user may confirm display operations of the display unit 140 and the manipulation unit 120 even if the sliding unit 300 slides on a partial region of the main body 200.

Since the respective modes contain different status information and operating keys required to change the status information are displayed on a per mode basis, it is possible to reduce the number of operating keys of the remote control apparatus 100. Thus, even a user who is not accustomed to manipulating the operating keys of the remote control apparatus 100 can easily manipulate the operating keys.

Although the present embodiment describes information about the operating keys corresponding to the respective modes as being transmitted from the external device, the present invention is not limited thereto. Alternatively, the remote control apparatus 100 may store information about the operating keys corresponding to the respective modes, and also, may store information about the mode change sequence. Accordingly, the first controller 170 may transmit a mode change command based on information about the stored next operation mode if the second sliding operation is sensed.

In the present embodiment, the display unit 140 may simultaneously display target status information and current status information. However, as occasion demands, the target status information and the current status information may be alternately displayed at predetermined time intervals.

Also, the sliding operation described in the present invention is given only by way of example. It will be appreciated that the sliding unit 300 may be disposed on one surface of the main body 200 so as to overlap with different regions of the main body 200, and that the change of modes may be set in various manners according to the sliding operation of the sliding unit 300.

The present invention may be realized using a processor readable code provided in a recording medium that can be read by a processor of the portable terminal, such as a Mobile Station Modem (MSM). The recording medium that can be read by the processor may be selected from among all kinds of recording mediums in which processor readable data can be stored. Examples of the recording mediums that can be read by the processor include a ROM, a RAM, a Compact Disc Read Only Memory (CD-ROM), a magnetic tape, a floppy disc, and an optical data storage device. In addition, a carrier wave for data transmission may be used. The recording mediums that can be read by the processor may be distributed over a computer system connected thereto via a network, and may store and execute processor readable code.

As is apparent from the above description, in a remote control apparatus and a system thereof according to the present invention, operation of an external electronic device can be controlled in correspondence to sliding operation of a sliding unit provided in the remote control apparatus, whereby a user can more dynamically control the electronic device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A remote control apparatus comprising:
    a main body;
    a sliding unit that is slidable along a plurality of positions at the main body;
    a communication unit to communicate with an external device;
    a controller to control a mode of the external device in correspondence to a position among the plurality of positions of the sliding unit with respect to the main body;
    a display unit disposed at one surface of the main body to display status information of the external device; and
    a manipulation unit to allow a user input to change the status information,
    wherein the controller changes the mode of the external device from a power off mode to a power on mode when the sliding unit slides from a first position to a second position of the main body,
    wherein the controller displays a status information of the external device on a portion of the display unit corresponding to the first position when the sliding unit slides from the first position to the second position of the main body,
    wherein the controller displays operating keys on the manipulation unit when the sliding unit slides from the first position to the second position of the main body, and
    wherein the display unit and the manipulation unit take the form of touch screens.

2. The remote control apparatus according to claim 1, wherein the manipulation unit comprises a plurality of keys to change the status information, and at least one of the keys change different kinds of the status information according to the mode of the external device.

3. The remote control apparatus according to claim 1, wherein the status information comprises at least one of current status information of the external device and target status information of the external device corresponding to the user input.

4. The remote control apparatus according to claim 1, wherein the controller changes the mode of the external device from the power on mode to the power off mode when the sliding unit slides from the second position to the first position of the main body.

5. The remote control apparatus according to claim 1, wherein the controller changes the mode of the external device from a first operation mode to a second operation mode when the sliding unit disposed at the second position of the main body slides to the first position of the main body and slides back to the second position of the main body.

6. The remote control apparatus according to claim 1, wherein the communication unit communicates wire or wirelessly with the external device.

7. A communication system comprising an electronic device and a remote control device to communicate with the electronic device, comprising:
    the electronic device including a first communication unit; and
    the remote control device including:
        a main body including a display unit,
        a sliding unit with a manipulation unit at an outer surface that is slidable along the main body such that the sliding unit overlaps with a portion of the main body at a first position and with at least part of the remaining portion of the main body at a second position,
        a controller to generate a command to change a mode of the electronic device in correspondence to the sliding unit sliding from the first position to the second position,
        a second communication unit to communicate the command generated by the controller to the first communication unit of the electronic device,
    wherein the controller provides status information of the electronic device on the first position of the main body in correspondence to the changed mode of the electronic device,
    wherein the controller provides operating keys on the sliding unit in correspondence to the changed mode of the electronic device, and
    wherein the display unit and the manipulation unit take the form of touch screens.

8. An external device control method of a remote control apparatus comprising a main body and a sliding unit that is slidable along the main body, the external device control method comprising:
    sensing by the controller, a sliding of the sliding unit from a first position where the sliding unit overlaps with a portion of the main body including a display unit to a second position where the sliding unit overlaps with at least part of the remaining portion of the main body;
    generating a command by the controller to change a mode of an external device corresponding to a sliding operation of the sliding unit from the first position to the second position;

causing by the controller to display status information of the external device on the first position of the main body in correspondence to the changed mode of the external device; and causing by the controller to display operating keys on a manipulation unit at an outer surface of the sliding unit in correspondence to the changed mode of the external device, wherein the display unit and the manipulation unit take the form of touch screens.

9. The external device control method according to claim 8, wherein the status information is displayed at one surface of the main body.

10. The external device control method according to claim 8, further comprises causing by the controller to wire or wirelessly transmit the generated command to the external device.

\* \* \* \* \*